(12) United States Patent
Teetzel et al.

(10) Patent No.: US 9,194,678 B2
(45) Date of Patent: Nov. 24, 2015

(54) MODULAR ROCKET SYSTEM

(71) Applicant: Wilcox Industries Corp., Newington, NH (US)

(72) Inventors: James W. Teetzel, York, ME (US); Marc J. Celona, Dover, NH (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 610 days.

(21) Appl. No.: 13/870,340

(22) Filed: Apr. 25, 2013

(65) Prior Publication Data

US 2015/0247714 A1 Sep. 3, 2015

Related U.S. Application Data

(60) Provisional application No. 61/638,368, filed on Apr. 25, 2012.

(51) Int. Cl.
| F42B 15/01 | (2006.01) |
| F42B 15/10 | (2006.01) |
| G05D 1/00 | (2006.01) |
| G05D 1/10 | (2006.01) |
| F42B 15/36 | (2006.01) |
| F42B 15/00 | (2006.01) |

(52) U.S. Cl.
CPC ............... *F42B 15/01* (2013.01); *F42B 15/10* (2013.01); *F42B 15/36* (2013.01); *G05D 1/0011* (2013.01); *G05D 1/107* (2013.01)

(58) Field of Classification Search
CPC .......... F42B 15/00; F42B 15/01; F42B 15/10; F42B 15/36; G05D 1/0011; G05D 1/10; G05D 1/107; G05D 1/12

USPC ............ 244/3.1–3.3, 117 R, 118.1; 102/374, 102/377, 378, 293
See application file for complete search history.

(56) References Cited

U.S. PATENT DOCUMENTS

| 2,976,806 | A | * | 3/1961 | Risk et al. ................. 244/118.1 |
| 4,051,414 | A | * | 9/1977 | Will et al. ..................... 102/293 |
| 4,112,843 | A | * | 9/1978 | Laviolette ..................... 244/3.3 |
| 4,364,530 | A | * | 12/1982 | Ripley-Lotee et al. ....... 244/3.22 |
| 4,410,151 | A | * | 10/1983 | Hoppner et al. ............. 244/3.27 |
| 4,533,094 | A | * | 8/1985 | Geis et al. ..................... 244/3.22 |
| 4,844,380 | A | * | 7/1989 | Peoples et al. .............. 244/3.22 |
| 5,238,204 | A | * | 8/1993 | Metz ........................... 244/3.15 |
| 5,245,927 | A | * | 9/1993 | Ranes .......................... 102/378 |
| 5,322,248 | A | * | 6/1994 | Ragab ......................... 244/3.15 |
| 5,439,188 | A | * | 8/1995 | Depew et al. ............... 244/3.21 |
| 5,780,766 | A | * | 7/1998 | Schroppel ................... 244/3.27 |
| 5,834,684 | A | * | 11/1998 | Taylor .......................... 244/3.28 |
| 6,021,716 | A | * | 2/2000 | Taylor .......................... 244/3.28 |
| 6,244,535 | B1 | * | 6/2001 | Felix ............................ 244/3.16 |
| 6,568,330 | B1 | * | 5/2003 | Kaiserman et al. ...... F42B 15/10 102/374 |
| 6,588,700 | B2 | * | 7/2003 | Moore et al. ................. 244/3.28 |
| 7,947,938 | B2 | * | 5/2011 | Dryer ........................... 244/3.21 |
| 8,546,736 | B2 | * | 10/2013 | Dryer ........................... 244/3.21 |

* cited by examiner

*Primary Examiner* — Bernarr Gregory
(74) *Attorney, Agent, or Firm* — McLane, Middleton, Professional Association

(57) ABSTRACT

In one aspect, a modular rocket system comprises a guidance module defining a nose, the guidance module including a guidance system for guiding the modular rocket system toward a target. A flight control module is removably attachable to the guidance module and includes a plurality of airfoils, the airfoils being moveable between a retracted state and an extended state. A munition module is removably attached to the flight control module and includes a hollow interior configured to carry a payload material. A rocket module is attached to the munition module and includes a rocket motor configured to propel the modular rocket system. In a further aspect, a modular rocket system having a plurality of interchangeable modules is provided.

20 Claims, 12 Drawing Sheets

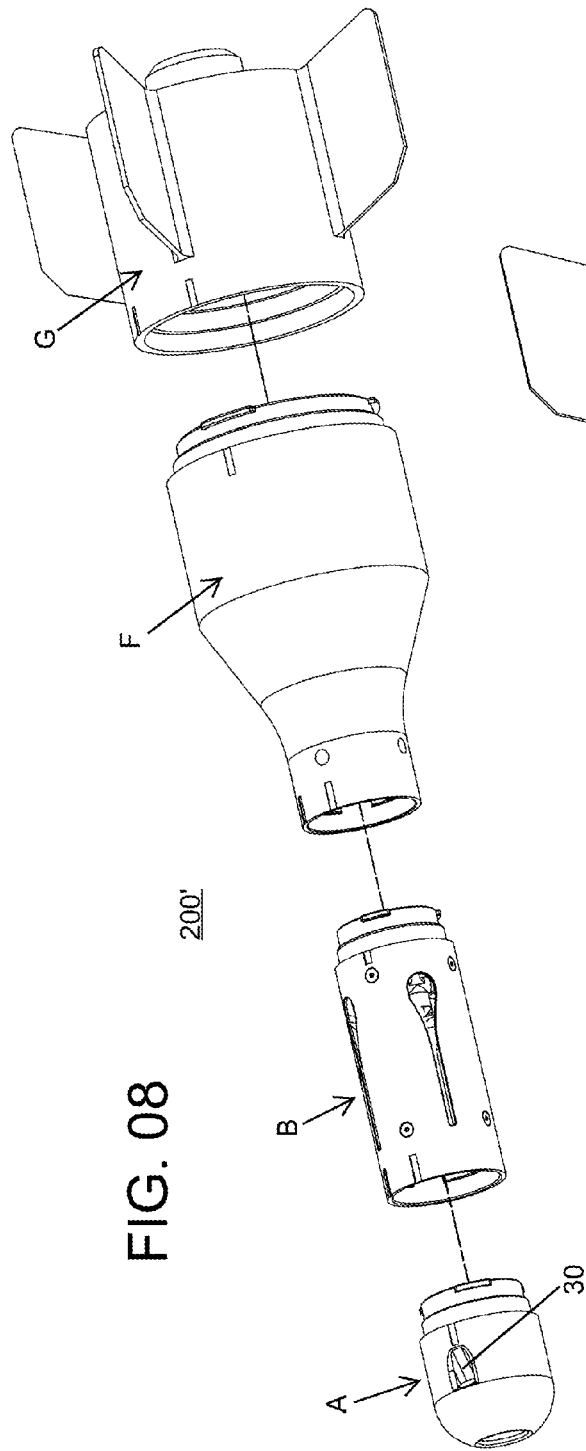
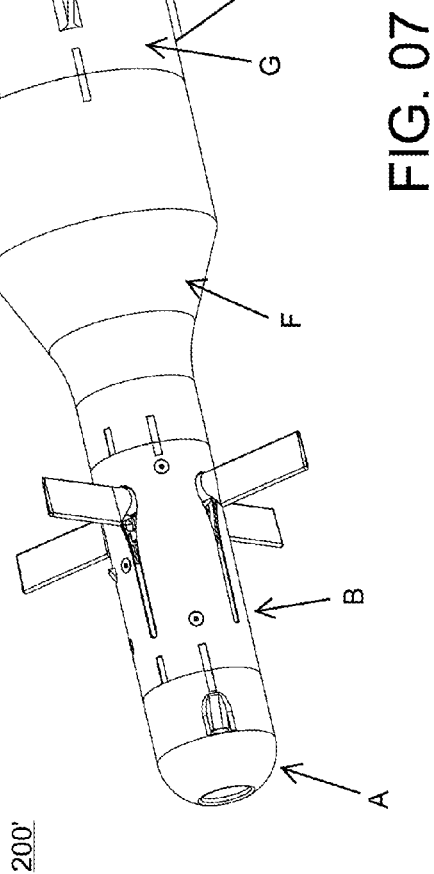

MODULAR ROCKET SYSTEM

CROSS-REFERENCE TO RELATED APPLICATION(S)

This application claims the priority benefit of U.S. Provisional Application No. 61/638,368 filed Apr. 25, 2012. The aforementioned application is incorporated herein by reference in its entirety.

BACKGROUND

The present disclosure relates generally to rocket-boosted projectiles and, more particularly, to a modular, scalable, rocket-boosted, self-guided warhead system and method. One advantage of the present system resides in its ability to use a common guidance and flight control system which, in turn, can be used across various multiple rocket configurations to increase flexibility in terms of target type, range, and launch platform, as well as to the reduce costs associated with the manufacture and deployment of such systems. In especially preferred embodiments, the present system can be adapted for firing from preexisting launch platforms, thus further reducing costs and facilitating deployment.

SUMMARY

In one aspect, a modular rocket system comprises a guidance module defining a nose, the guidance module including a guidance system for guiding the modular rocket system toward a target. A flight control module is removably attachable to the guidance module and includes a plurality of airfoils, the airfoils being moveable between a retracted state and an extended state. A munition module is removably attached to the flight control module and includes a hollow interior configured to carry a payload material. A rocket module is attached to the munition module and includes a rocket motor configured to propel the modular rocket system.

In a further aspect, a modular rocket system comprises a guidance module defining a nose, the guidance module including a guidance system for guiding the modular rocket system toward a target. A flight control module is removably attachable to the guidance module and includes a plurality of airfoils, the airfoils being moveable between a retracted state and an extended state. The modular rocket system of this embodiment further includes a plurality of interchangeable munition modules, each of which is configured for removable attachment to the flight control module. Each of the interchangeable munition modules includes a hollow interior configured to carry a payload material. The modular rocket system according to this embodiment also includes a plurality of interchangeable rocket modules, each of which is configured for removable attachment to at least one of the interchangeable munition modules. Each of the interchangeable rocket modules includes a rocket motor configured to propel the modular rocket system.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 7 is an isometric view of a modular rocket system in accordance with a third exemplary embodiment.

FIG. 8 is an assembly view of the embodiment appearing in FIG. 6.

DETAILED DESCRIPTION OF THE PREFERRED EMBODIMENTS

Figure 1:
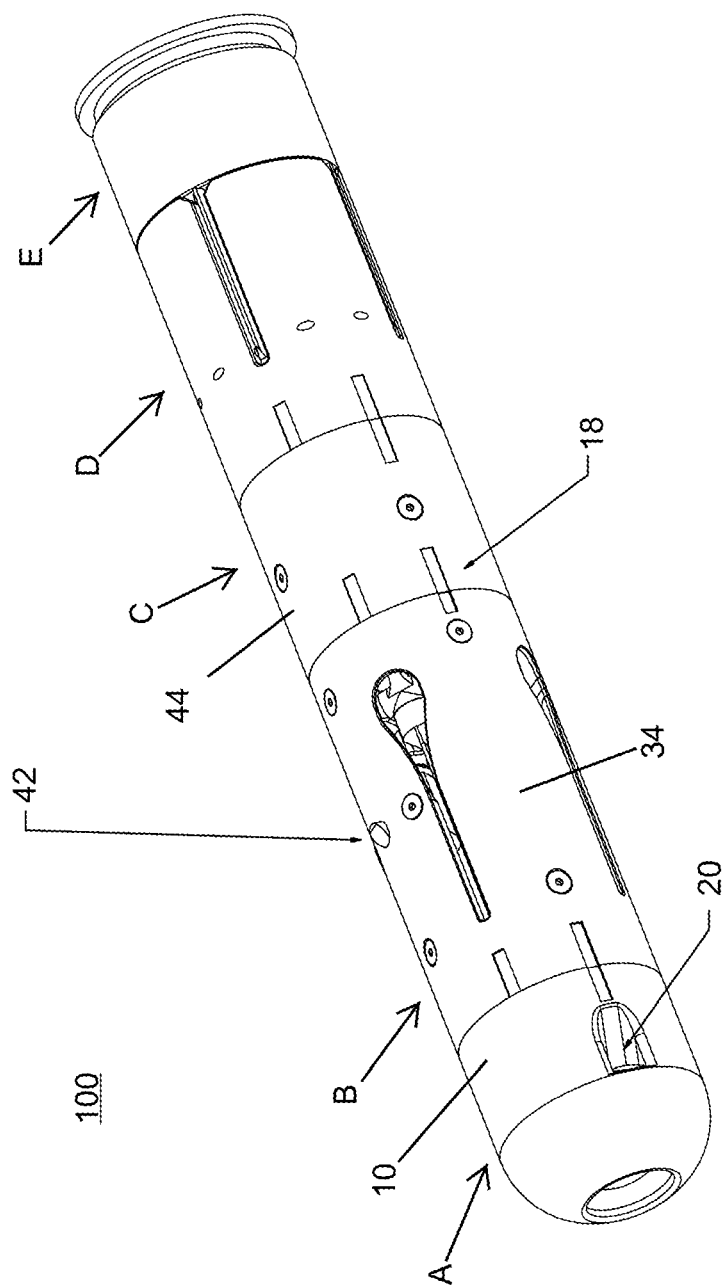
FIG. 1 is an isometric view of a modular rocket system in accordance with a first exemplary embodiment of the present disclosure, wherein the wings appear in the folded position.
Figure 3:
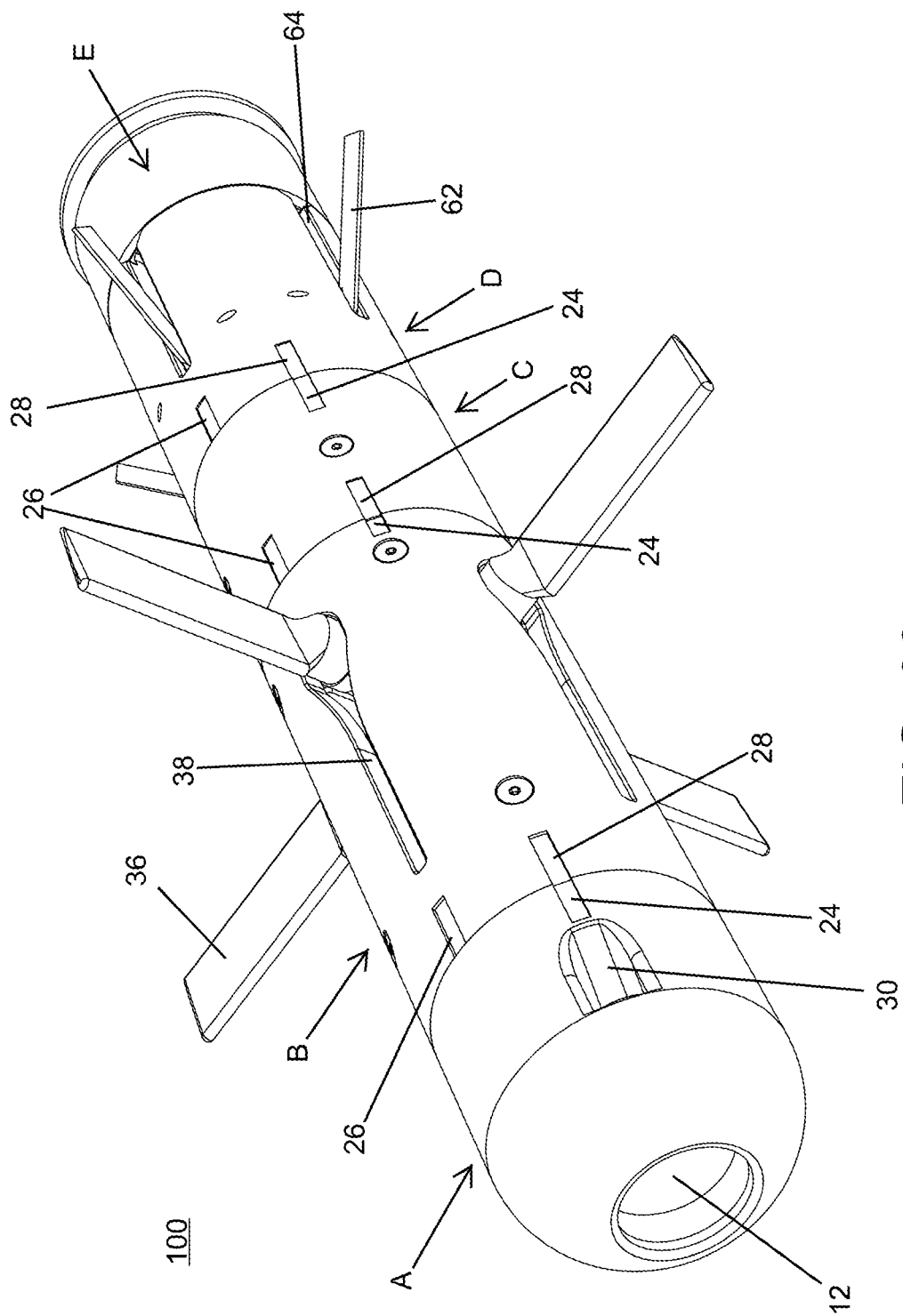
FIG. 3 is an isometric view of the embodiment shown in FIG. 1, wherein the wings appear in the extended position.
Figure 4:
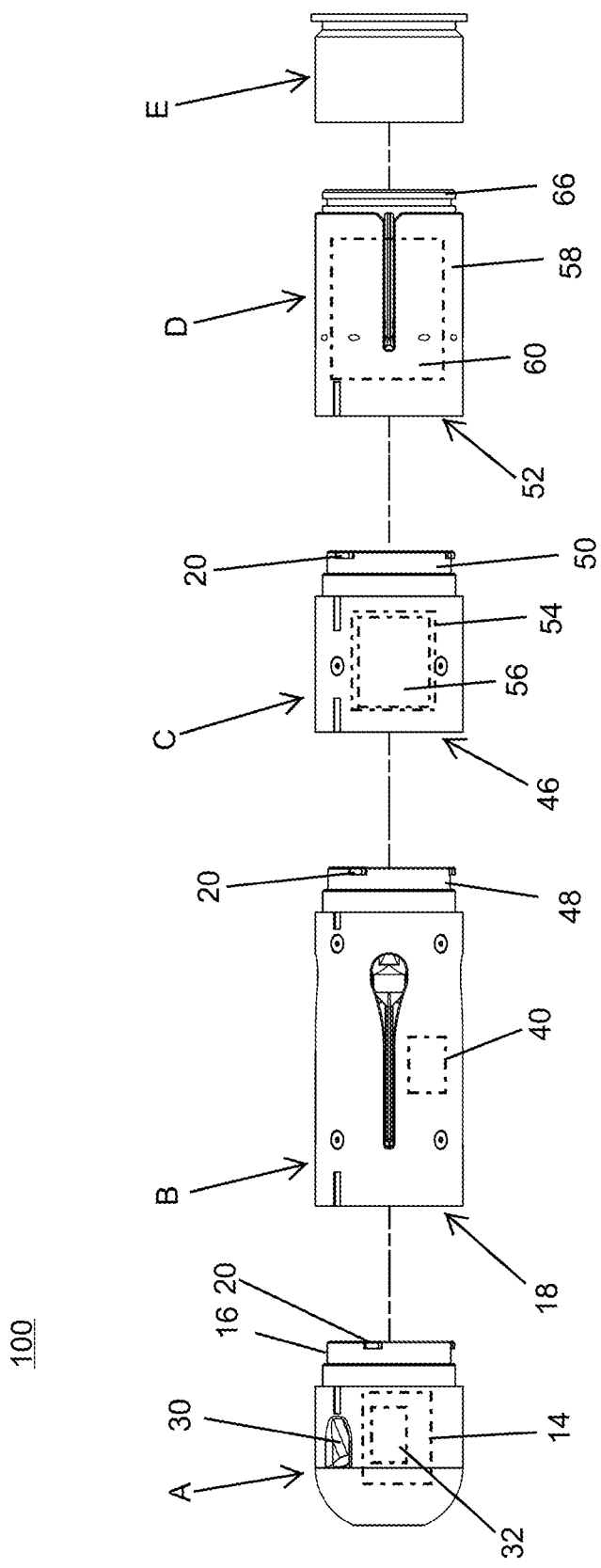
FIG. 4 is a side assembly view of the embodiment appearing in FIG. 1.

Referring now to FIGS. 1, 3 and 4, there is shown an exemplary modular rocket system 100, which includes a guidance module A, a flight control module B, a munition module C, a motor module D, and a cartridge shell E.

The guidance module A includes a generally rounded, conical or otherwise tapered outer shell construction 10 shaped to minimize aerodynamic resistance. The guidance module A defines an interior cavity 12 and houses a computer-based guidance system 14. The guidance system 14 may include any one or more any known types of guidance systems to allow the modular rocket 100 herein to strike an intended target. Exemplary guidance systems include, for example, a navigational guidance system, such as Global Positioning System (GPS) based guidance systems, Global Navigation Satellite System (GLONASS) based guidance systems, etc., inertial guidance systems, etc. Alternatively, the guidance system 14 may be a target seeking system such as thermal guidance systems, laser tracking guidance systems, etc. Other types of guidance systems include terrestrial guidance systems, television/electrographic image based guidance system, camera based scene matching guidance systems, and so forth.

The guidance control module A includes a rear connector 16 which is complimentary with and removably attachable to a forward facing connector 18 on the flight control module B. The rear connector 16 and the forward connector 18 may include complimentary and aligned facing surfaces. In the illustrated embodiment, the rear connector 16 includes keyed projections 20 which are received in complimentary openings, channels or grooves 22 (see FIG. 6) to allow the units A, B to be inserted and then twisted into the locked position. In preferred embodiments, markings or indicia may be provided on adjacent modules which are aligned when the connected modules are in the proper locked position, to thereby provide a visual indication to the user when the modules are connected correctly. For example, in the depicted embodiment, the guidance module A includes a marking 24 on the rearward end, which is aligned with a marking 26 on the forward end of the flight control module B when the units are in the unlocked position and which is aligned with a marking 28 on the forward end of the flight control module B when the units are in the locked position. Like markings 24, 26, and 28 may also be provided on adjacent module pairs, e.g., B, C and C, D, etc.

A communications port, e.g., an infrared (IR) communication port 30 of the guidance system 14 may be provided on the guidance module A to communicate with an associated guidance system to program the rocket system 100 prior to launch. For example, the guidance system 14 may communicate, e.g., via the IR port 30 or other wireless interface with a weapon mounted fire control system, a ballistics computer, range finder, etc., to enable the modular rocket system 100 to follow a desired trajectory or to otherwise strike an intended target.

An electrical interface may be provided within the forward and rear connectors to provide an electrical signal to the guidance computer when the segments A and B are connected properly. The electrical connections between adjacent attached members may also be provided to ensure that a given rocket construction prepared using the present modular components comprises a proper configuration of modules. In a preferred embodiment, the electrical connections between the adjacent modules serve as an interlock mechanism preventing the system 14 from booting up unless the attached components are properly attached and in a proper configuration. Alternatively, or in addition, the keyed projections 20 and receptacles 22 on the connecting ends of each module may be keyed with distinct geometry to inhibit the improper attachment or combination of modules.

The guidance system 14 includes a guidance computer 32, such as a processor, microprocessor, microcontroller, etc., operably coupled to the flight control module B. The flight control module B includes a generally cylindrical outer shell housing 34 receiving a plurality of airfoils or wings 36 circumferentially spaced about the flight control module B. The wings 36 can be folded into receptacles 38 in the body of the flight control module B to allow the assembled system 100 to fit into a launch platform, which is discussed below, prior to launch of the unit 100. As seen in FIG. 1, when the wings 36 are in the folded state, the wings 36 are received in the complimentary openings 38 in the module B body.

The flight control module B may include an electronic memory 40 operably coupled to the processor 32 for storage of instructions received from the guidance module A as well as a plurality of flight control algorithms specific to each particular configuration. Preferably, the memory 40 storing the flight control algorithm is rewritable, thus allowing the flight control module to be updated with new flight control algorithms to accommodate additional modules. The flight control module B is configured to sense the particular modules selected in a given configuration and selects an appropriate flight control algorithm specific to that configuration, such algorithms taking into account factors such as weight, balance, and others. The identity of the attached modules in a selected configuration of may be detected by or transmitted to the flight control module B via a data bus, such as a serial bus, controller area network (CAN) bus, or other electronic, electromechanical, and/or optoelectronic communications interface between the connected modules.

As seen in FIG. 3, after firing, the wings 36 can be moved to their extended position. Each of the wings 36 is independently controllable and may be rotated or tilted as ailerons to provide maneuverability/steering control as well as stability of the modular rocket system during flight. The wings 36 are small enough to fit within the housing shell to allow the system 100 to fit within the constraints of the launching platform while providing the ability to allow the system 100 to perform banking and turning maneuvers during flight and, in preferred embodiments, are large enough to steer the rocket system 100 around obstacles during flight. Additionally or alternatively, the system 100 may be maneuvered by a conventional thrust vector control system, e.g., of the type using a gimbaled booster nozzle to steer the weapon. The wings 36 may be actuated and controlled via springs, hydraulics, pneumatics, motors, and so forth.

An optional safety plunger or button 42 may be provided on the exterior surface at a position on the flight control module housing 34 which will be received within the launch platform, e.g., the launch tube 252 (see FIG. 10) in the case of a grenade launcher or like single shot platform, or on or within the body or bomb/rocket bay of an aircraft when dropped from a UAV or other aircraft. In this manner, the safety plunger 42 functions as a safety interlock to prevent the wings 36 from deploying when the unit 100 is still in the launch platform.

The munition module C includes an outer shell 44, a front connector 46 for removable attachment to a rear connector 48 of the flight control module B, and a rear connector 50 for connection to a front connector 52 on the booster module D. The manner of connection may be generally as detailed above, and the connectors may in include the projections 20 and complimentary receivers 22 as detailed above, although the geometry of the connection may be different to avoid attaching the modules improperly, e.g., in terms of sequence or compatibility. Electrical connections may be provided between adjacent attached modules to generate a signal input to the guidance processor to indicate which modules are present, whether the modules are properly connected to each other, and/or whether the combination and/or sequence of connected modules is appropriate.

The housing shells, wings, vanes, etc., of the present system may be formed of a metal or metal alloy material or a composite material comprising a fiber reinforced polymer material as are known in the aerospace industry.

The munitions module C includes a hollow compartment or chamber 54 configured to carry a payload 56 of explosives, including conventional or nuclear explosives, or other target and/or fighting force defeating agents or materials. The munition module C may be configured to carry a desired warhead, depending on the intended target, such as warheads to be used against heavy armored fighting vehicles, light armored vehicles, anti personnel warheads, or other special purpose warheads.

The rocket booster module D includes an outer shell housing 58 defining a rocket motor configured with a rocket-based propulsion system 60 as would be generally known in the art. The rocket motor 60 may be powered by any suitable rocket fuel in any suitable form, including solid, liquid, gel, or any combination thereof. A plurality of retractable air vanes or fins 62 are folded into receptacles 64 in the housing shell and are extended for stability during flight. In certain embodiments or configurations, the rocket module D may be provided with fixed vanes or fins.

In certain embodiments, the rocket system 100 may be configured to be fired from a standard or conventional launch platform, such as a grenade launcher 250 (see FIGS. 9-11) e.g., a single shot 40 mm grenade launcher. The rearward end 66 of the motor module D is received within a 40 mm shell casing or cartridge E, which includes a charge of explosive material to propel the rocket system 100 out of the launch tube of the launch platform. The charge may be relatively small, since for rocket boosted configurations it is only necessary to launch the rocket system 100 a sufficient distance away from the operator to safely fire the rocket motor D. In preferred embodiments, the launch platform is the M320 grenade launcher, although it will be recognized that the present system may be adapted for use with other calibers and/or launch platforms, including shoulder fired, stationary, etc. In certain embodiments, the cartridge E may be omitted or replaced with a blank module E' (as described below) for embodiments wherein the modular rocket system is to be dropped or launched from an aircraft, as described below.

Figure 2:
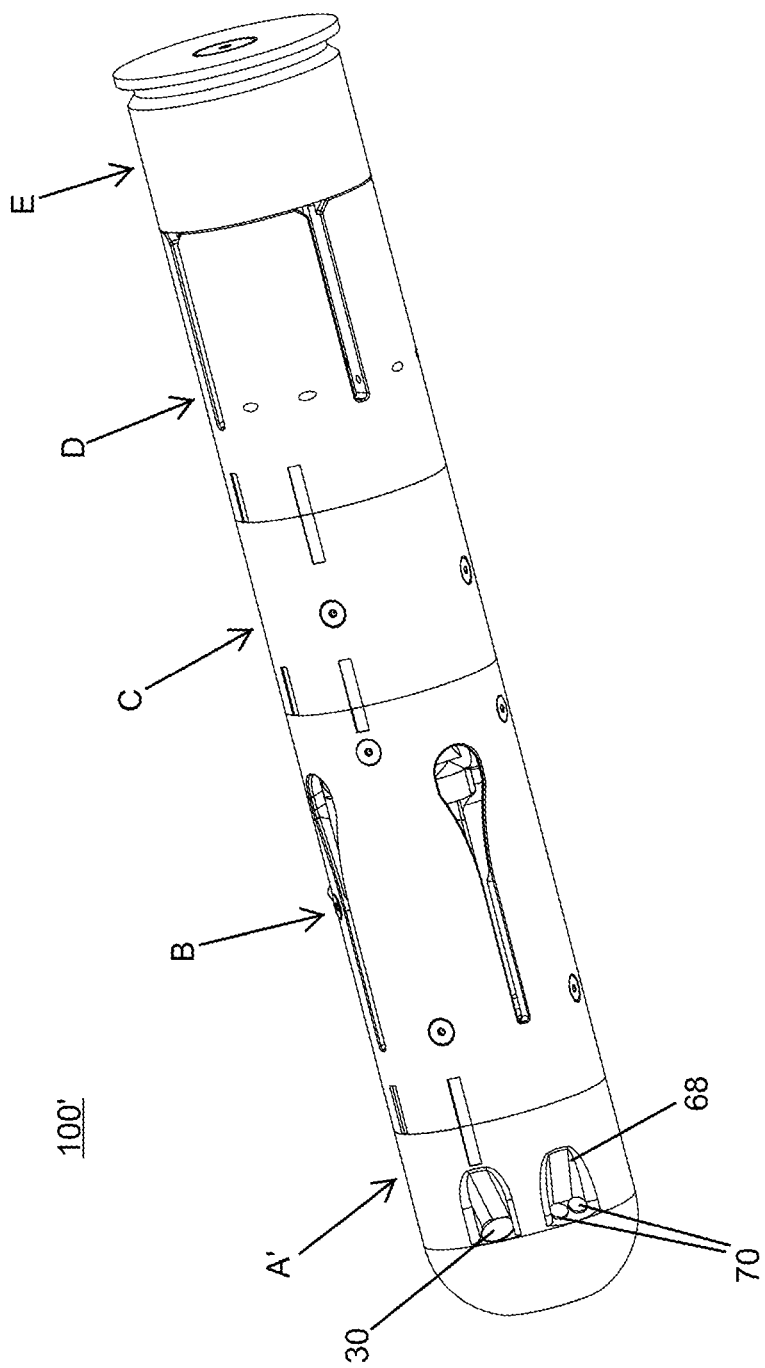
FIG. 2 is an isometric view of a modular rocket system in accordance with a further exemplary embodiment of the present disclosure, wherein the wings appear in the folded position, and which similar to the embodiment of FIG. 1, but wherein a visual indicator is provided to provide the operator with a visual indication of the programming status of the rocket system.

Referring now to FIG. 2, there appears a further embodiment rocket system 100', wherein a guidance module A' includes a visual indicator 68 comprising one or more light elements 70, such as LED lights for providing a visual indication to the operator of the program status of the guidance module when the guidance module has been programmed and is ready to be fired. In a preferred embodiment, multiple light elements may be employed. For example, one of the light elements 70 may emit a visible light signal, e.g., a visible LED, when the rocket has been programmed and is ready to fire and another one of the light elements 70 emits an infrared signal, e.g., an IR LED, to provide a signal viewable to an operator wearing a night vision viewing device or other IR-sensitive viewing device.

One of the advantages of the modular rocket system herein is that the system is scalable such that a common guidance nose cone module A and flight control module B may be employed with a variety of munition sizes depending on the intended target, including munitions modules of different calibers or sizes. Likewise, any of multiple sized rocket motor modules may be used, e.g., wherein a larger motor may be selected where there is a longer distance to the target.

Figure 5:
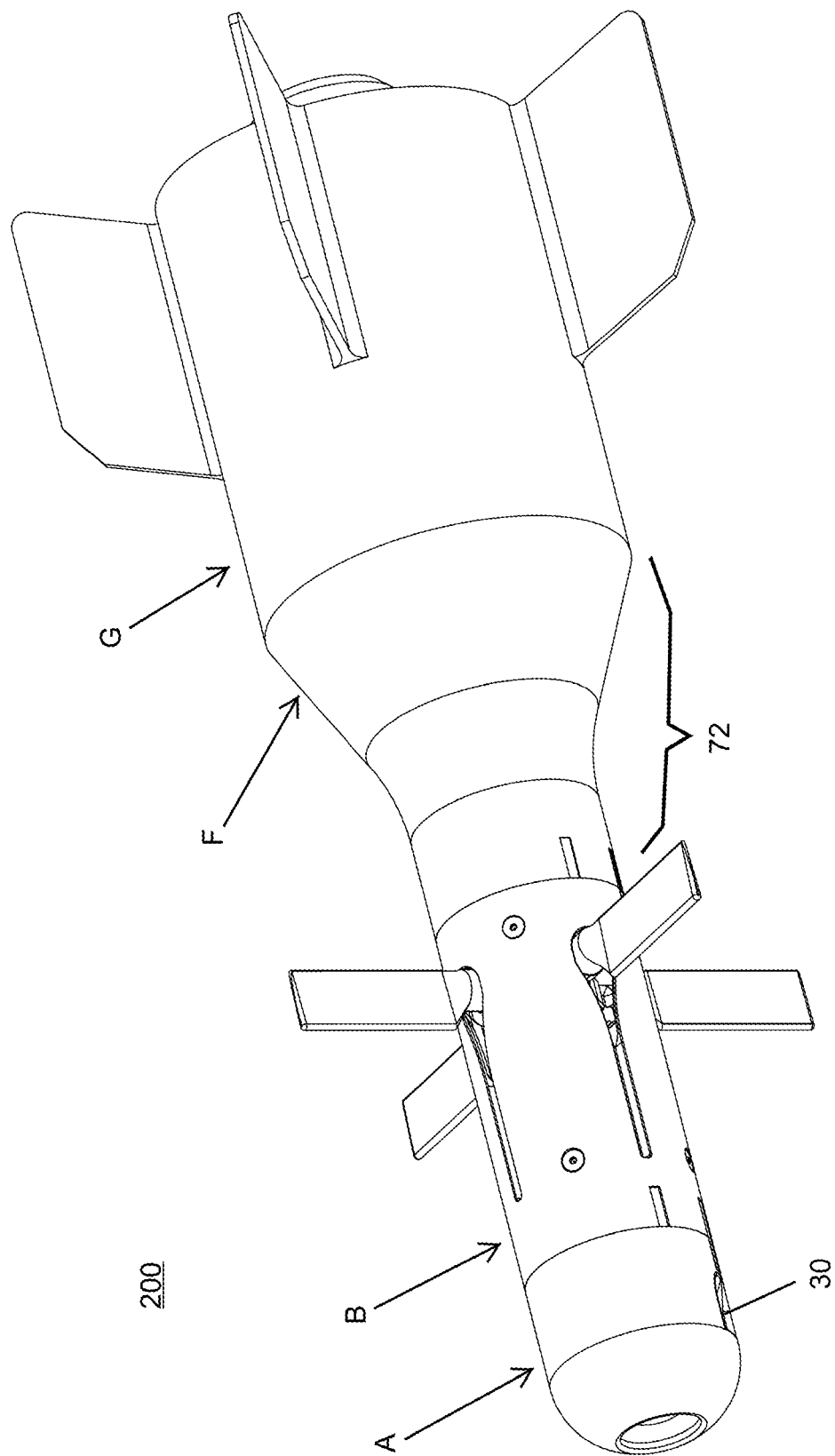
FIG. 5 is an isometric view of a modular rocket system in accordance with a second exemplary embodiment.
Figure 6:
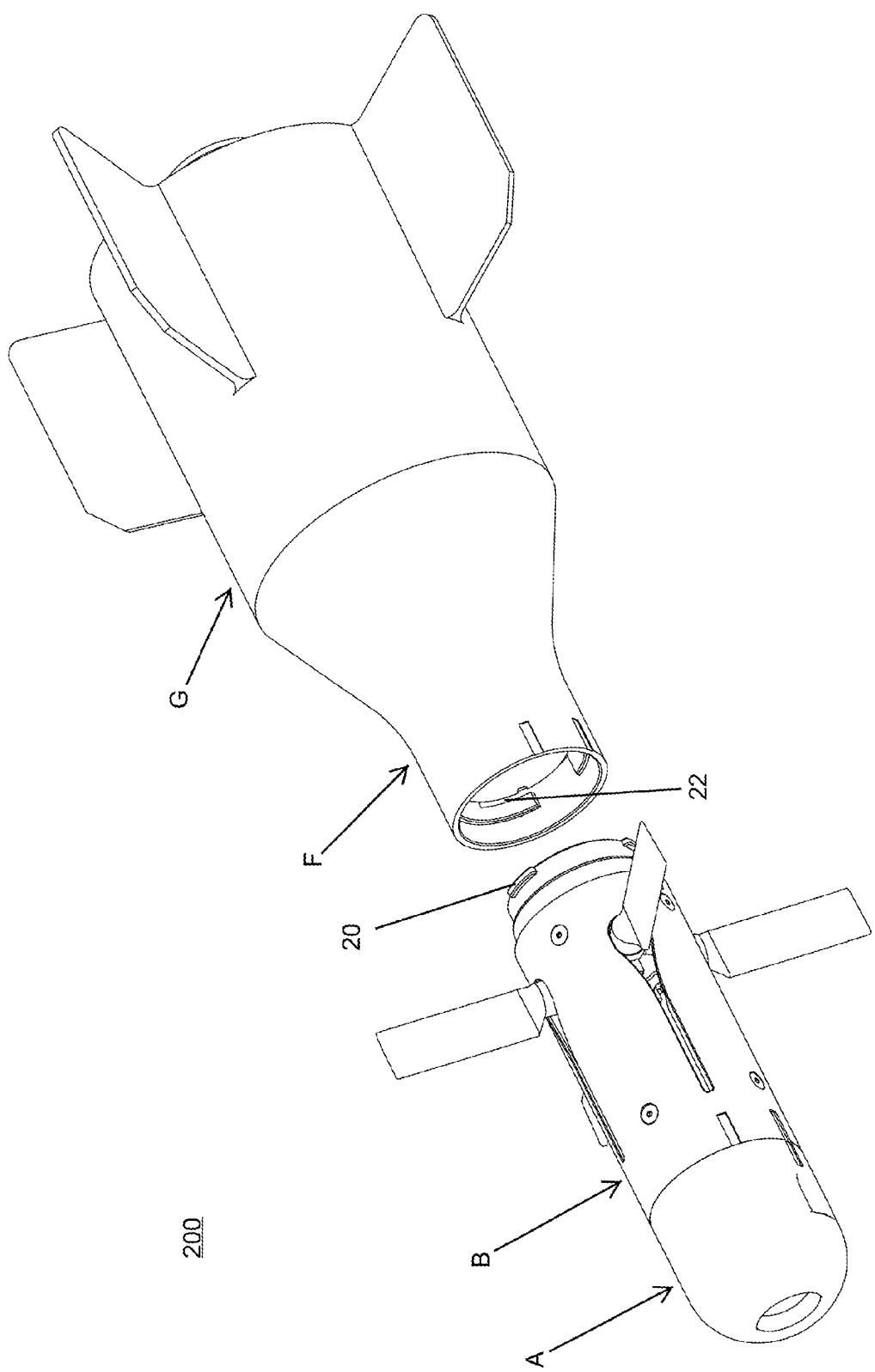
FIG. 6 is an isometric assembly view of the embodiment appearing in FIG. 4.

For example, FIGS. 5 and 6 illustrate a second configuration 200 and FIGS. 7 and 8 illustrate a third configuration 200' wherein the guidance module A flight control module B are coupled to a larger diameter munition module F and motor module G. In the illustrated embodiment of FIGS. 5 and 6, the munition module F and motor module G are integrally formed; however, it will be recognized that the munitions module F and the rocket module G could be separately formed and attachable as shown in FIGS. 7 and 8. The munition module F includes tapered profile 72 to provide an aerodynamic shape. In alternative embodiments, the munitions module could be generally cylindrical, and a separate, tapered coupling member could be provided to provide an aerodynamic shape between the smaller diameter guidance and flight control system modules A and B and the larger diameter munition and motor modules F and G.

In this manner, the present system is scalable and allows the use of common guidance and flight control hardware and software with munitions and/or rocket motors of different size. The large rocket configurations 200 and 200' may be adapted for use with a conventional rocket platform, such as the Spike, Javelin, or TOW missile/rocket launcher platforms, or the like. Alternatively, the large configurations could be adapted for use with a custom or dedicated launch platform.

Figure 9:
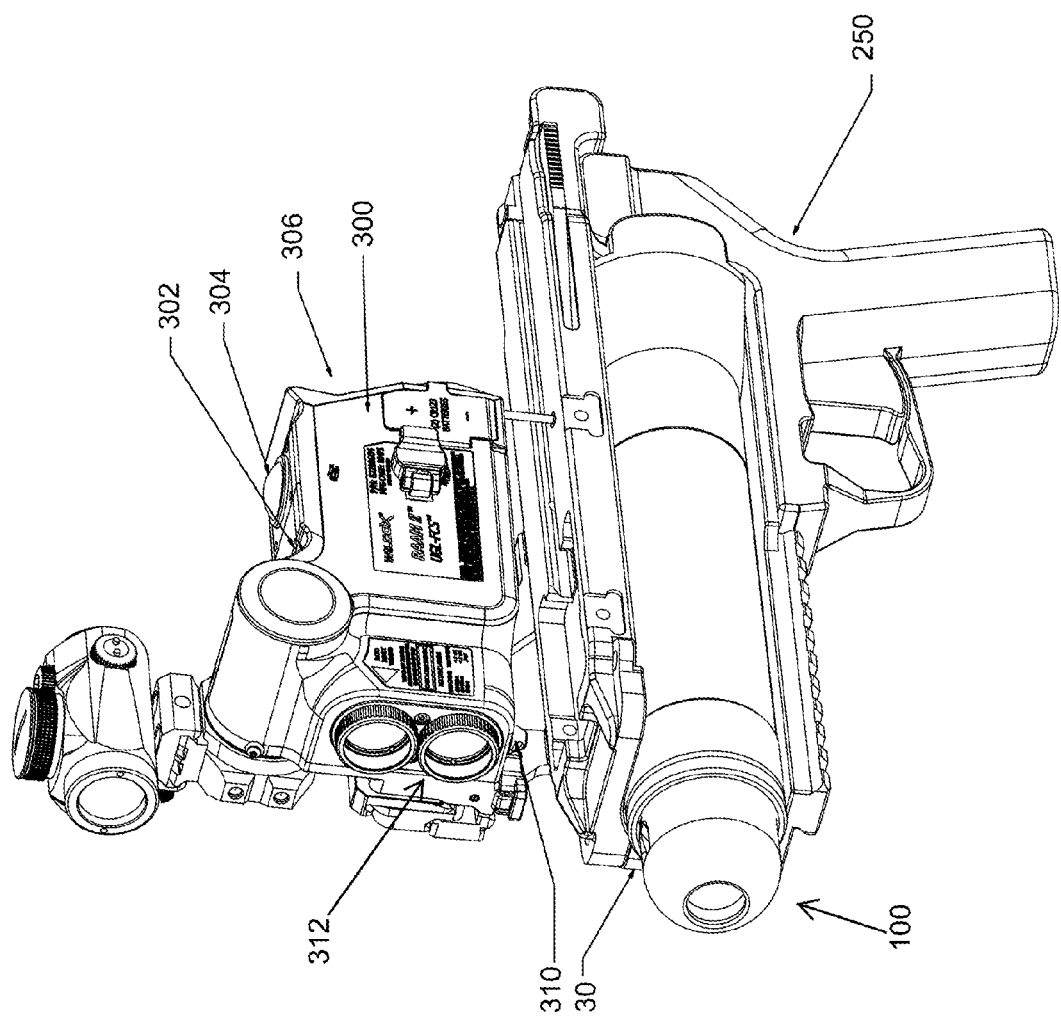
FIG. 9 is a generally front and side isometric view of an exemplary launch apparatus for launching the guided rocket in accordance with this disclosure.
Figure 10:
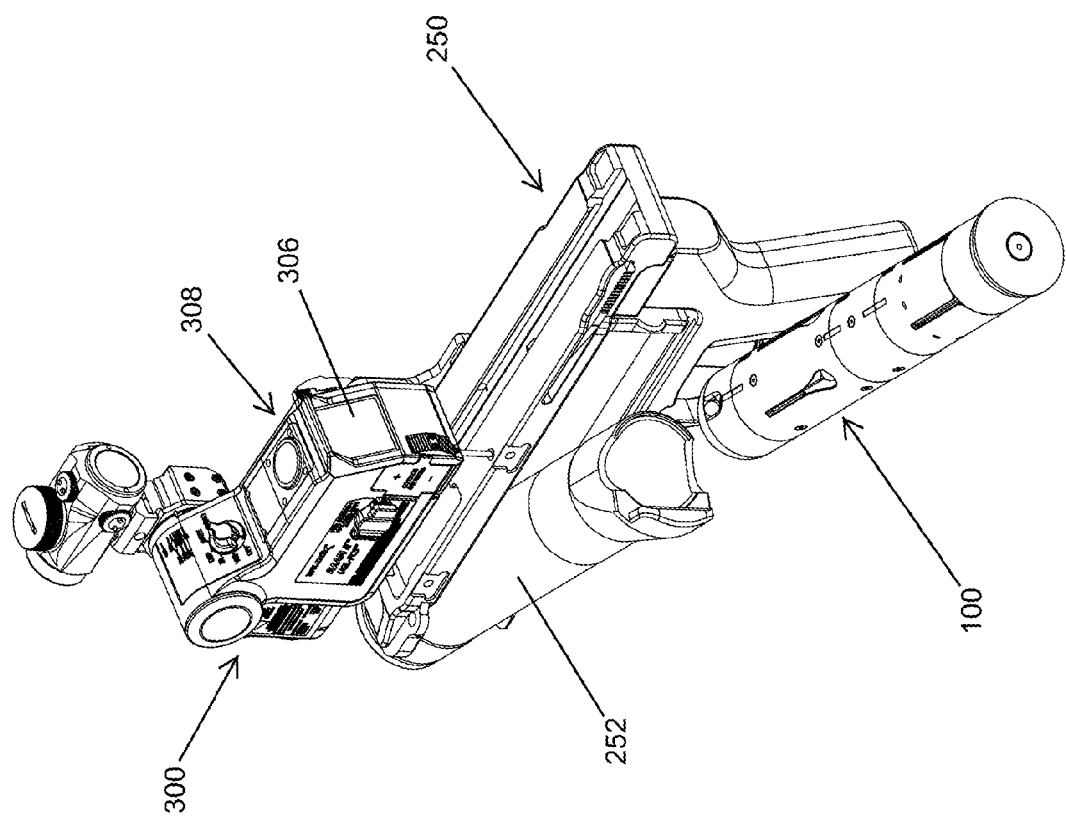
FIG. 10 is a generally rear and side isometric view of the launch apparatus appearing in FIG. 9, wherein the launch tube is shown in the open position and showing a modular rocket in accordance with this disclosure removed from the launch tube.
Figure 11:
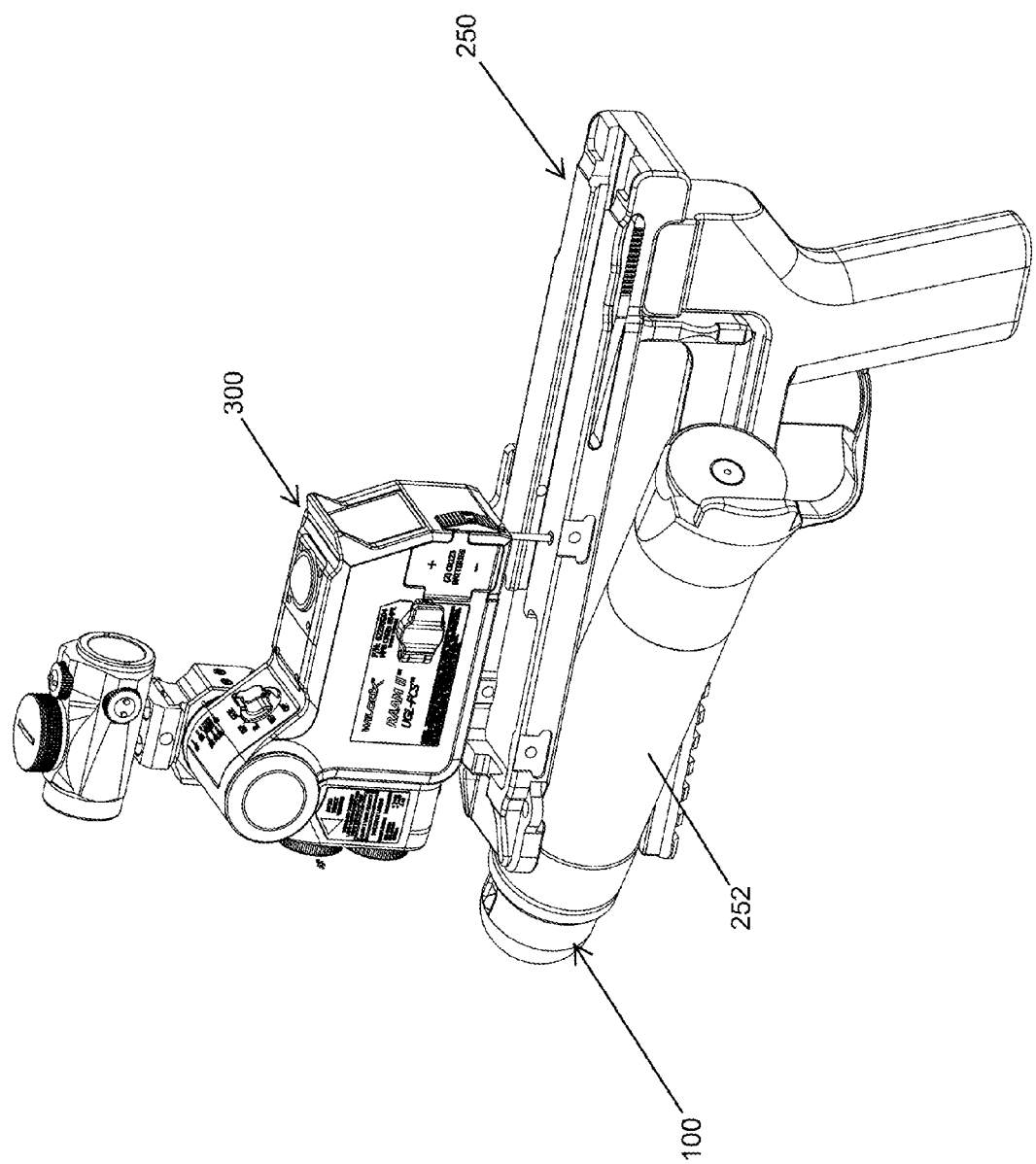
FIG. 11 is a generally rear and side isometric view of the launch apparatus appearing in FIG. 9, wherein the launch tube is shown in the open position and wherein the modular rocket herein is received within the launch tube.

Referring now to FIGS. 9-11, there is shown a grenade launcher 250. The modular rocket system herein is advantageous in that it can be adapted for use with an existing launch platform, such as a grenade launcher or the like. Advantageously, the grenade launcher 250 is based on the M320 platform and preferably the Heckler & Koch HK M320. However, it is also contemplated that the modular rocket system of this disclosure could be adapted for use with other standard launch platforms or with a custom or dedicated launch platform.

FIGS. 10 and 11 illustrate the manner in which the modular rocket configuration example 100 is loaded into the launch tube 252 of the grenade launcher 250. A fire control system 300 is mounted on the grenade launcher 250. The fire control system 300 includes means for determining the geographic position of the user, such as a GPS receiver 302 or the like, a celestial positioning unit 304, and/or other means for determining position, including without limitation an input device or interface 306 for inputting the user's geographic position or coordinates to the fire control system 300.

The illustrated embodiment depicts the grenade launcher 250 with the fire control system 300 as would be used for stand-alone operation. It will be recognized, however, that the grenade launcher 250 may also be attached to a rifle (not shown). For example, the grenade launcher 250 may be attached to a bottom rail firearm interface, such as the bottom rail of a Picatinny (MIL-STD-1913) rail system, and the fire control system 300 may be mounted to another rail. In the depicted embodiment, the fire control system 300 includes a rail grabber 308 on the right side thereof for mounting to the left side rail interface of the firearm, although other configurations are contemplated.

The fire control system 300 includes an onboard ballistics computer which may be operated in a first mode of operation for use in connection with a grenade or other non-guided projectile in which a laser range finder may be used to determine a distance to a target and an onboard ballistics computer calculates a trajectory and automatically rotating a pointing laser so that aligning the pointing laser with the target will cause the grenade launcher of other launching platform will be at the proper angle for firing the weapon. The first mode of operation of the fire control system 300 may be as described in commonly owned U.S. Pat. No. 8,047,118 issued Nov. 1, 2011, U.S. Pat. No. 8,100,044 issued Jan. 12, 2012, U.S. Patent Application No. 60/957,608 filed Aug. 23, 2007, U.S. Patent Application No. 61/081,972 filed Jul. 18, 2008, and U.S. patent application Ser. No. 13/286,737 filed Nov. 1, 2011. Each of the aforementioned patents and patent applications is incorporated herein by reference in its entirety.

The fire control system 300 is also operable in a second mode of operation in which the fire control unit 300 designates target information to the flight control system A of the modular rocket 100. In the depicted preferred embodiment, program instructions are transmitted to the flight control system A via an infrared (IR) interface comprising an IR transmitter 310 on the fire control system 300 and the aligned and facing IR receiver 30 on the rocket 100. It will be recognized, however, that the program instructions may be transmitted to the flight control system of the rocket 100 via a radio frequency transmission between the fire control system 300 and the guidance control module A, or any other suitable wireless communication or networking protocol, such as BLUETOOTH®, WI-FI®, ZIGBEE®, ANT®/ANT+®, IEEE™ 802.15.4, Z-WAVE®, etc.

In the depicted embodiment, the fire control system 300 includes the GPS positioning system 302 and the celestial positioning system 304 to determine the geographic coordinates of the operator, including elevation information. The geographic coordinates of the target may be calculated relative to the known coordinates of the operator by using a range finder module 312 of the fire control system 300 to determine the range and inclination/net elevation change to the target. In certain embodiment, the coordinates of the target, if known, may be input directly by the operator.

Alternatively, the rocket 100 may be programmed to operate in a laser-guided mode, wherein the flight control system A will guide the rocket 100 to a laser spot trained on the target, or a "heat-seeking" mode wherein the flight control system A will steer the rocket 100 to a target based on the target's thermal emissions or heat signature. It will be recognized that other guidance or homing methods may be employed, including television/image based methods such as digital scene matching, terrestrial based methods, and others.

The modular rocket system herein has been shown and described by way of reference to the preferred embodiments, wherein the rocket is fired from a grenade launcher 252 or other launch platform in single shot mode. Multi-shot launch platforms are also contemplated. In addition, the modular rocket system herein may also be launched from an air vehicle, including all manner of manned and unmanned aerial vehicles. In an especially preferred embodiment, the present modular rocket system is adapted to be launched from an unmanned aerial vehicle (UAV) such as an unmanned aerial combat vehicle. In an especially preferred embodiment, the rocket system herein may be used in conjunction with a man portable, ground launched UAV. Such vehicles may be autonomous or remotely piloted and may provide a loitering capability, e.g., to allow remote monitoring of a target area and/or to delay firing the rocket 100 until a suitable target appears or until certain conditions are met.

Figure 12A:
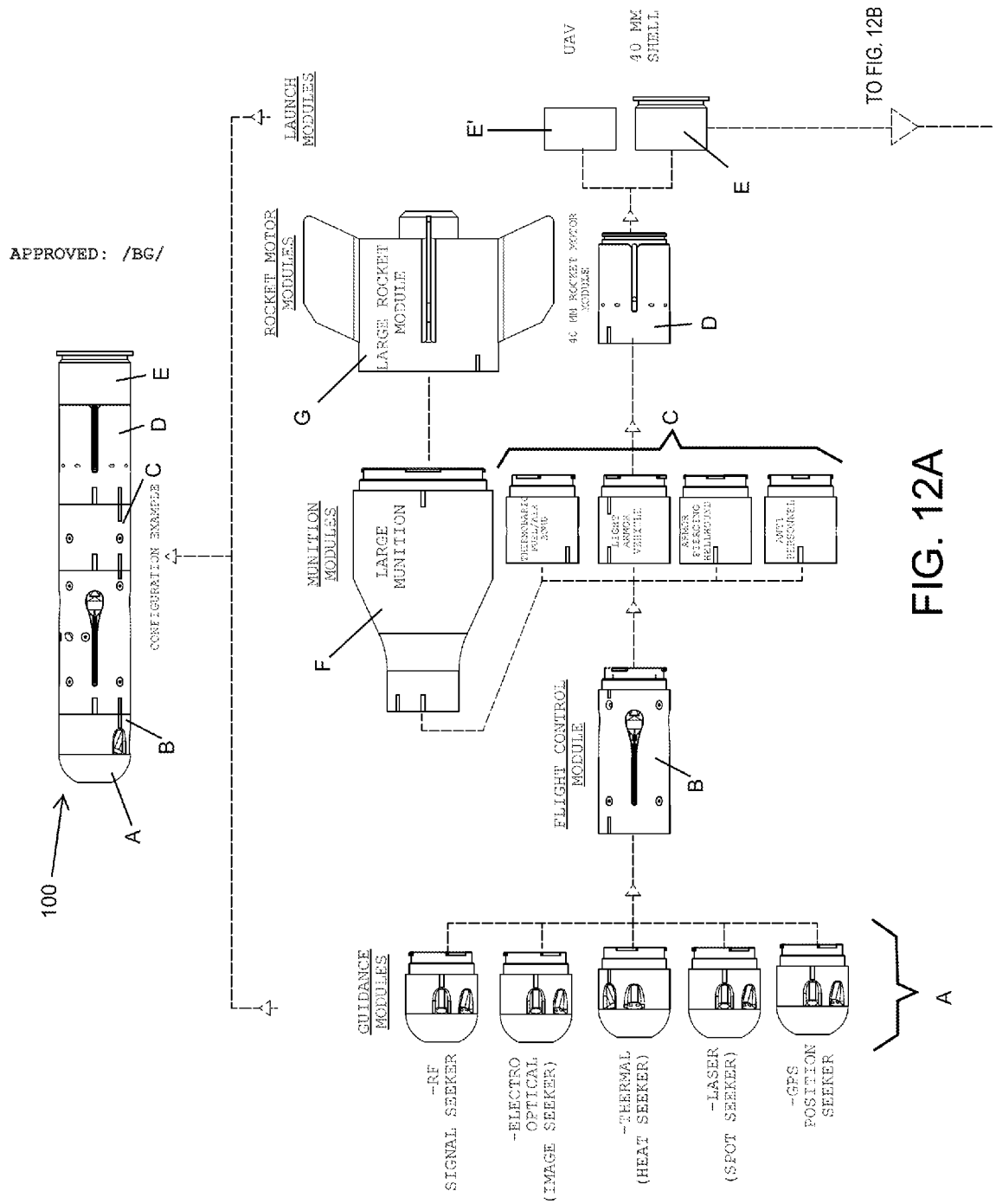
FIGS. 12A and 12B depict a matrix illustrating an exemplary embodiment of a modular rocket system comprising interchangeable modules according to the present disclosure.
Figure 12B:
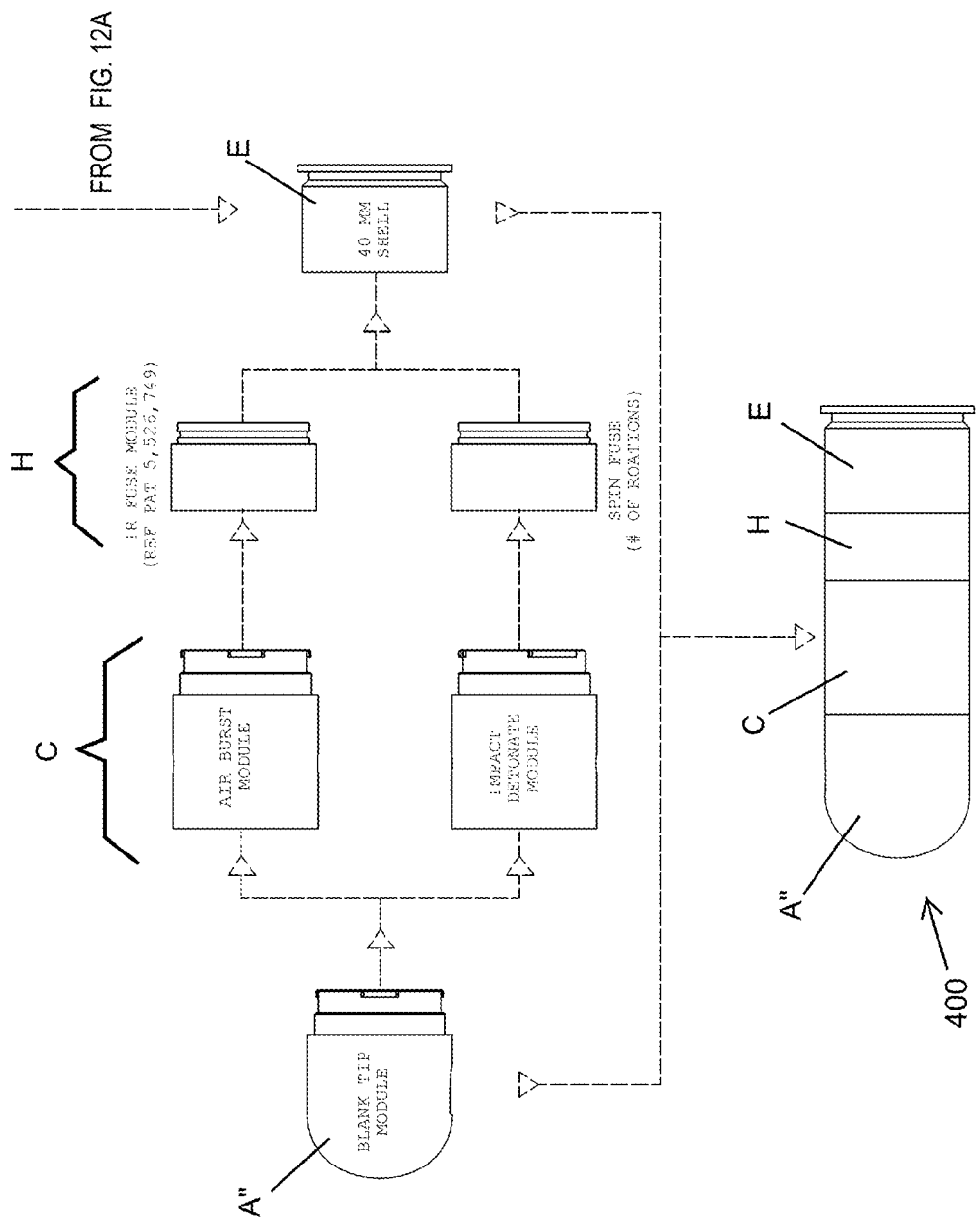

Referring now to FIGS. 12A and 12B, there appears a matrix illustrating the manner in which modules can be combined to create a variety of weapon configurations. The guidance module A may be any of a plurality of guidance modules, including RF seeking, electro/optical (image seeking), point of aim/point of impact, (e.g., which can be programmed to detonate after it travels a predetermined distance or can be otherwise programmed to detonate at a set detonation point), thermal seeking, laser seeking, GPS. A blank or dummy module A" may be used in place of the module A for non-guided configurations as will be described below. It will be recognized that other types of guidance modules are also contemplated, such as inertial guidance modules and others.

The interchangeable guidance modules may be used with the common flight control module B, the desired one of the munition modules C (for the small diameter configuration) or F (for the large diameter configuration). The exemplary interchangeable munition modules for the small diameter configuration C may be selected from an air burst or smart grenade module (e.g., which will detonate in mid air creating an airburst shrapnel effect, typically after the round has traveled a certain distance); a light armor vehicle munition, antipersonnel munitions, impact grenades, armor-piercing grenades, e.g., HELLHOUND™ 40 mm Low Velocity Multi-Purpose Grenade (Martin Electronics, Inc., Perry, Fla.), and others.

Although only one large munition module F is shown, it will be recognized that a plurality of interchangeable large munition modules could also be provided. Similarly, a single small diameter rocket motor module D is shown for the small configuration and a single large diameter rocket module E is shown for the large configuration, in FIG. 12A. It will be recognized, however, that a plurality of interchangeable large and/or small diameter rocket motor modules could also be provided.

Likewise, only two diameters are illustrated (e.g., 40 mm and 80 mm), however, it will be recognized that the present system could be adapted for any number of rocket sizes, calibers, or launch platforms. It will be recognized that the present system can be adapted to any other size rocket, including 120 mm, and others, while utilizing a common guidance and flight control system.

A cartridge casing E with a charge sufficient to eject the round 100 from the launch tube is provided, and can be replaced with a blank module E' when the modular rocket is intended to be dropped from an aircraft. The module E' may include a clamp or other fastener for releasably securing the rocket 100 to a UAV or other aircraft, e.g., to an exterior surface of the aircraft or within a rocket bay of the aircraft, etc.

In especially preferred embodiment, a dummy round or blank A", which lacks a guidance computer, may be provided for use in place of the guidance module A in certain configurations. In instances where the blank nose cone module A" is used, the flight control module B can be omitted. In such instances, the nose cone module A" is attached directly to a desired one of the munition modules C. A fuse module H is then attached to the munitions module C to control the detonation of the munition module.

FIG. 12B illustrates two exemplary types of fuse modules, including an IR or other laser detonated fuse module H which may employ an optical/mechanical detonation system as described in U.S. Pat. No. 5,526,749, incorporated herein by reference in its entirety. Another exemplary fuse module H is a spin fuse module, e.g., which detonates the munition module when a predetermined number of rotations (caused by rifling of the launch tube) has been reached, among others. It will be recognized the any other type of fuse may be employed with the module H, including, fuses employing all manner of electronic, mechanical, elements, chemical, or pyrotechnic elements, or combinations thereof, to signal or actuate detonation of the munition module C. Other fuses, not shown, may include impact fuses which initiate detonation upon impact with the target or when the velocity otherwise decreases rapidly, timer based fuses, and so forth. An exemplary embodiment modular, non-guided configuration 400 includes a blank nose module A", a selected munition module C, a selected fuse module H, and a cartridge module E.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A modular rocket system, comprising:
    a guidance module defining a nose, said guidance module including a guidance system for guiding said modular rocket system toward a target;
    a flight control module removably attachable to the guidance module, said flight control module including a plurality of airfoils, said airfoils being moveable between a retracted state and an extended state;
    a munition module removably attached to the flight control module, said munition module including a hollow interior configured to carry a payload material; and
    a rocket module attached to the munition module, said rocket module including a rocket motor configured to propel the modular rocket system.

2. The modular rocket system of claim 1, further comprising:
    a wireless interface for communication with a weapon mounted fire control system.

3. The modular rocket system of claim 1, further comprising:
  a memory storing a program of instructions for execution by the guidance system.

4. The modular rocket system of claim 1, further comprising a data bus for communication a sensed configuration of attached modules.

5. The modular rocket system of claim 1, further comprising:
  said flight control module including a safety interlock for preventing movement of said wings to the extended state when the modular rocket system is received in a launch platform.

6. The modular rocket system of claim 1, further comprising:
  a payload material received within to hollow interior of the munition module.

7. The modular rocket system of claim 6, wherein said payload material includes an explosive material.

8. The modular rocket system of claim 1, further comprising:
  said rocket module including a plurality of vanes for providing stability during flight.

9. The modular rocket system of claim 1, further wherein said rocket motor is powered by a rocket fuel material in a form selected from a solid, liquid, gel, or combination thereof.

10. The modular rocket system of claim 1, wherein the rocket module is removably attached to the munition module.

11. The modular rocket system of claim 1, further comprising:
  a shell casing attached to the rearward end of the rocket module, said shell casing including a charge of explosive material configured to propel the modular rocket system a distance prior to said rocket motor being fired.

12. The modular rocket system of claim 11, wherein said shell casing is a 40 mm shell casing.

13. The modular rocket system of claim 1, further comprising:
  a blank shell casing attached to the rearward end of the rocket module.

14. The modular rocket system of claim 1, further comprising:
  an indicator for providing a visual indication of a status of the modular rocket system.

15. The modular rocket system of claim 1, wherein the modular rocket system is configured to fit into a conventional launch platform from which the modular rocket system can be launched.

16. A modular rocket system, comprising:
  a guidance module defining a nose, said guidance module including a guidance system for guiding said modular rocket system toward a target;
  a flight control module removably attachable to the guidance module, said flight control module including a plurality of airfoils, said airfoils being moveable between a retracted state and an extended state;
  a plurality of interchangeable munition modules, each of said interchangeable munition modules configured for removable attachment to the flight control module, each of said interchangeable munition modules including a hollow interior configured to carry a payload material; and
  a plurality of interchangeable rocket modules, each of said interchangeable rocket modules configured for removable attachment to at least one of said interchangeable munition modules, each of said interchangeable rocket modules including a rocket motor configured to propel the modular rocket system.

17. The modular rocket system of claim 16, wherein said plurality of interchangeable munition modules includes munition modules of different caliber.

18. The modular rocket system of claim 16, further comprising a launch platform.

19. The modular rocket system of claim 18, wherein said launch platform is selected from a grenade launcher and an unmanned aerial vehicle.

20. The modular rocket system of claim 16, further comprising:
  a fire control system configured to determine a target location and calculate a flight path to said target, said fire control system configured to communicate with said guidance system.

\* \* \* \* \*